Feb. 6, 1934.   C. RIEDEL   1,945,915
COMPRESSED AIR CREAM AND EGG WHIP
Filed Oct. 24, 1933
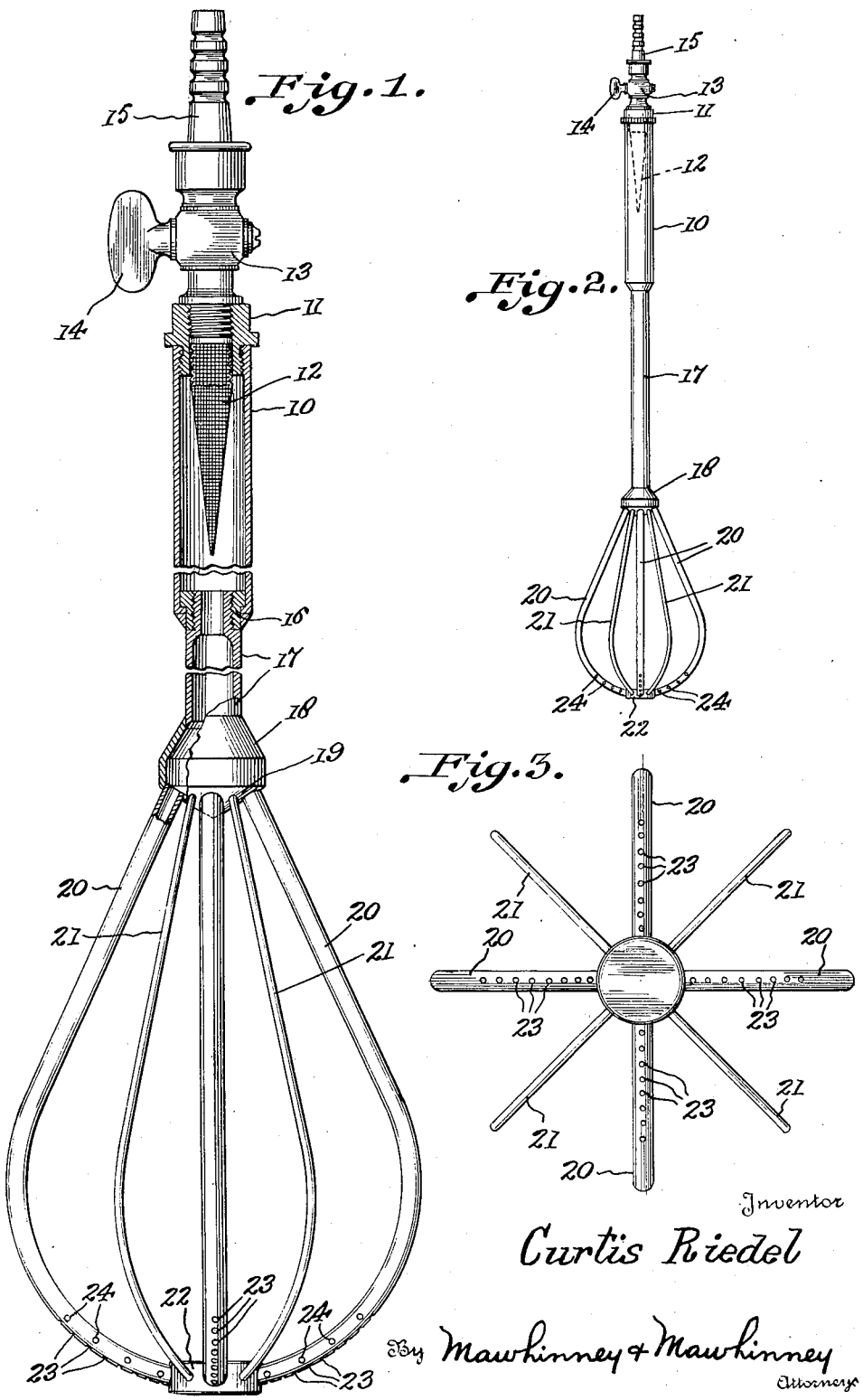
Inventor
Curtis Riedel
By Mawhinney & Mawhinney
Attorney Patented Feb. 6, 1934

1,945,915

UNITED STATES PATENT OFFICE 1,945,915

COMPRESSED AIR CREAM AND EGG WHIP

Curtis Riedel, New Brighton, Pa.

Application October 24, 1933. Serial No. 695,016

4 Claims. (Cl. 261—121)

The present invention relates to devices for whipping cream, eggs and other material, and has for an object to provide an improved construction of device by means of which air under pressure may be delivered to the material to be whipped, so as to more evenly distribute the air throughout the material and to insure the thorough whipping or beating of the material in a relatively short space of time.

Another object of the present invention is to provide a device of this character which may be grasped in the hand and used as a stirrer so as to facilitate the introduction of the air throughout the entire mass being whipped and to provide a device with which any suitable container may be employed, and wherein the material does not have to be transferred into different receptacles when it is desired to store the material away for any length of time after the beating operation.

The invention also aims at the provision of a compressed air whipping device which is provided with means which not only stirs or agitates the material, but which delivers air under pressure to the lower portion of the material to form air bubbles therein, and which also carries bubble-breaking wires or portions arranged between hollow air feeding tubes so as to facilitate the thorough mixing of the material and the consequent breaking up of the air bubbles as they are formed.

A further object of the invention is to provide a device or implement of this character which has a handle serving as a support for an air filter and also for a controlled connection for air under pressure so that the handle portion supports a valve or the like by means of which the flow of compressed air is regulated so that the air may pass through the handle and through a filter before the air is admitted to the head of the stirrer for liberation in the mass of material.

With the foregoing and other objects in view, the invention will be more fully described hereinafter, and will be more particularly pointed out in the claims appended hereto.

In the drawing, wherein like symbols refer to like or corresponding parts throughout the several views, Figure 1 is a side elevation, partly in section, of a whipping device or stirrer constructed according to the present invention.

Figure 2 is a side elevation of the complete device, on a reduced scale, and

Figure 3 is a bottom plan view of the head of the device on the scale of Figure 1.

Referring now to the drawing, 10 designates a handle or support which is hollow and which is interiorly threaded at its upper end to receive a screen nipple 11 which is secured into the upper end of the handle and carries an air screen 12 of any suitable mesh and material and which preferably is of downwardly tapering shape so as to freely fit within the handle 10. The screen nipple 11 carries at its upper side a suitable valve 13 having a thumb button 14 by means of which the valve may be adjusted for regulating passage of air downwardly through the screen and handle. The upper end of the valve 13 carries a connecting nipple 15 to which is adapted to be attached a hose, pipe or the like for supplying air under pressure to the valve 13.

The lower end of the handle 10 is provided with a threaded nut 16 which is fixed coaxially in the lower end of the handle and adapted to receive therein the upper threaded end of a hollow stem 17 which is of suitable length and which carries on its lower end the head of the device. The lower end of the stem 17 is secured to and communicates with a drum or enlargement 18 the bottom of which is preferably tapered downwardly as at 19 to provide a supporting wall for a circular row of alternately disposed hollow tubes 20 and mixing wires 21.

The tubes 20 open into the drum 18 while the wires 21 are merely secured to the lower wall 19 of the drum, and the tubes and wires diverge downwardly to a point near the lower end of the head where the tubes and wires are curved inwardly into convergent relation and are secured at their lower ends to a bottom disc 22. This disc 22 may be solid or other suitable construction and is preferably disposed coaxially with the handle 10 and other parts of the device. The lower ends of the tubes 20 are provided in their outer or bottom walls with vent openings or apertures 23 and they are also provided in their lower ends with lateral vents or openings 24. The tubes 20 and wires 21 thus provide a cage-like structure adapted to be moved through a mass of material to be beaten or whipped, the device being held in the hand by means of the tube or handle 10 so that it may be moved at will throughout the extent of the mass of material. During this mixing operation, which may be carried on slowly or with any desired speed, the air under pressure is admitted through the valve 13, passes through the screen 12, handle 10 and stem 17 into the drum and tubes so that the air under pressure is delivered to the material being mixed beneath the surface level thereof. The air thus forms bubbles in the material and the movement of the head through the material brings the tubes 20 and wires 21 into contact with the bubbles, breaking the same up and disbursing the air throughout the mass of material so that the latter is within a short time beaten or whipped into a frothy state. Of course the handle 10 may be otherwise supported than by hand and the device may be operated by a suitable machine or mechanism if so desired.

The location and mounting of the air screen 12 admits of the ready removal thereof for cleaning the screen and the screen nipple 11 serves the purpose of not only supporting the screen 12 but also the valve 13 so as to couple the handle 10 to the valve with the screen therebetween. The stem 17 may also be quickly and easily detached from the lower end of the handle 10 so that the parts may be readily separated for cleaning the same interiorly and exteriorly.

In one use of the device, such as for cream, an air hose or pipe is connected to the hose connection 15 at the top of the device. The material is disposed in any suitable container according to the amount of cream used and no special receptacle is required with the use of this device. The filter tube or handle 10 is now grasped firmly in the hand and the beater head inserted in the cream to a point almost touching the bottom of the receptacle. The valve 13 is adjusted to admit sufficient air under pressure through the device for causing the cream to foam or bubble. The cream is now stirred slowly until whipped. This operation is carried out with all other materials, some requiring more stirring than others and consequently the time within which the material is completely whipped or beaten varies to some extent.

In all cases, however, the air under pressure is jetted downwardly from the bottom of the head so as to form the air bubbles at or near the bottom of the mass of material. The vents 24 in the pipes 20 eject streams of air laterally from the head so that the air will pass intimately throughout all portions of the material mass. In stirring the head of the device is moved to different parts of the receptacle, depending upon the shape and size of the receptacle, so that the air is evenly distributed throughout the material mass and the material itself set up into desired whirls or streams to insure a thorough whipping or beating operation.

It is obvious that various changes and modifications may be made in the details of construction and design of the above specifically described embodiment of this invention without departing from the spirit thereof, such changes and modifications being restricted only by the scope of the following claims.

What is claimed is:—

1. A cream and egg whipping device, comprising a hollow handle portion, a compressed air connection connected to the upper end of the handle portion, an air filter disposed in the handle portion, a hollow head mounted on the lower end of the handle, a plurality of diverging tubes carried by and communicating with the head, a disc secured to and connecting the lower ends of the tubes, said tubes having air vents in their outer and lateral walls near the lower ends of the tubes, and stirring wires extending between the head and the disc and disposed alternately with the tubes.

2. A cream and egg whipping device, comprising a hollow tube providing a handle, a screen nipple threaded upon the upper end of the tube and having an air screen extending lengthwise into the tube, a valve mounted on the upper end of the nipple and adapted for communication with a source of air under pressure, a stem detachably mounted on the lower end of said tube, and a mixing head carried on the lower end of the stem, said mixing head having a circular row of alternately arranged tubes and wires, said tubes having air vents in their lower end portions for forming air bubbles in the material to be whipped and said wires adapted to mix the material and break-up said air bubbles.

3. A cream and egg whipping device, comprising a handle tube, an air filter mounted in said tube, a controlling valve mounted on the upper end of said tube and adapted for connection with a source of air under pressure, a stem detachably mounted on the lower end of the tube, a drum carried on the lower end of the stem and communicating therewith and having a downwardly tapering bottom wall, a plurality of alternately disposed tubes and wires secured to said downwardly tapering wall and with the tubes communicating with said drum, said tubes and wires diverging downwardly to a point near the lower end of the device and being curved inwardly into convergent relation, a bottom disc secured to said tubes and wires for supporting the same, said tubes having air vents in their lower end portions for forming air bubbles in material to be whipped, and said wires adapted to mix said material and break-up said air bubbles.

4. A cream and egg whipping device, comprising a hollow supporting tube, a controlled air connection mounted on said tube adapted for communication with a source of air under pressure, a stem mounted on said tube and having an enlarged drum at its lower end with a downwardly tapering lower wall, a circular row of alternately disposed tubes and wires secured to said downwardly tapering wall and diverging downwardly from the drum, the lower ends of said tubes and wires being curved inwardly in convergent relation to provide an open cage-like structure, a bottom disc secured to the lower ends of said tubes and wires for supporting the same, said tubes having bottom and lateral vent openings therein for egress of jets of air under pressure for forming air bubbles in a mass to be whipped, said wires adapted to stir said mass and break-up said air bubbles.

CURTIS RIEDEL.